May 7, 1968  R. A. HUSEN  3,381,987
DOUBLE WALL SEAL FOR ARTICULATED JOINTS
Filed June 4, 1965  2 Sheets-Sheet 1
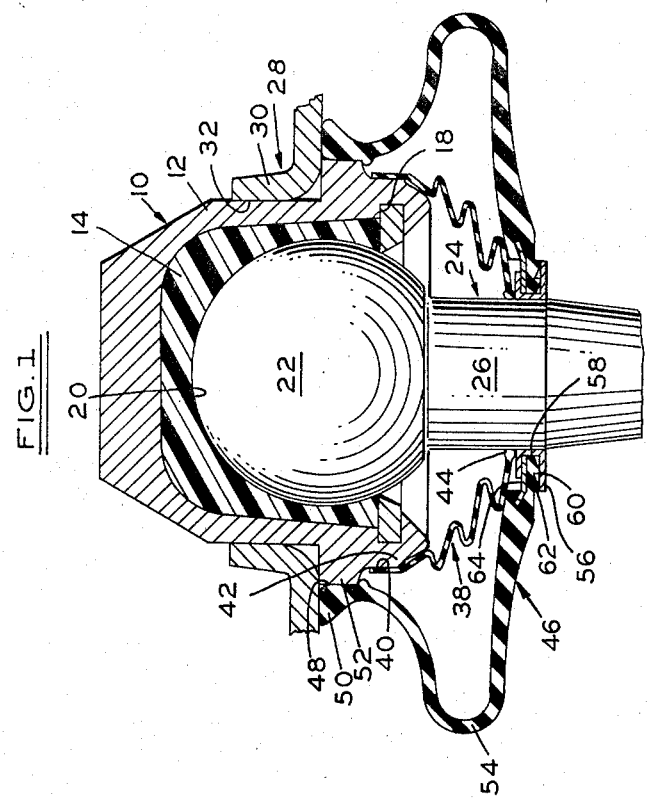
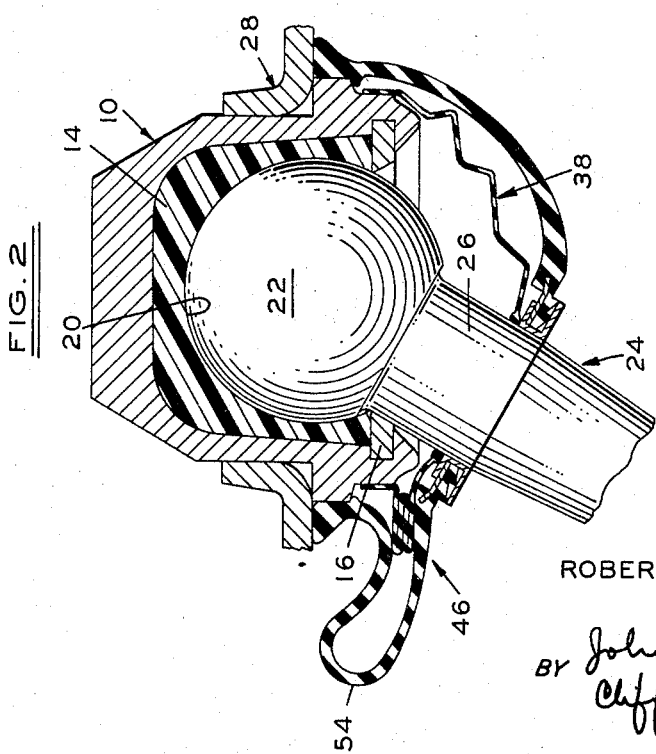
ROBERT A. HUSEN
INVENTOR
BY John R. Faulkner
Clifford L. Sadler
ATTORNEYS May 7, 1968  R. A. HUSEN  3,381,987
DOUBLE WALL SEAL FOR ARTICULATED JOINTS
Filed June 4, 1965  2 Sheets-Sheet 2
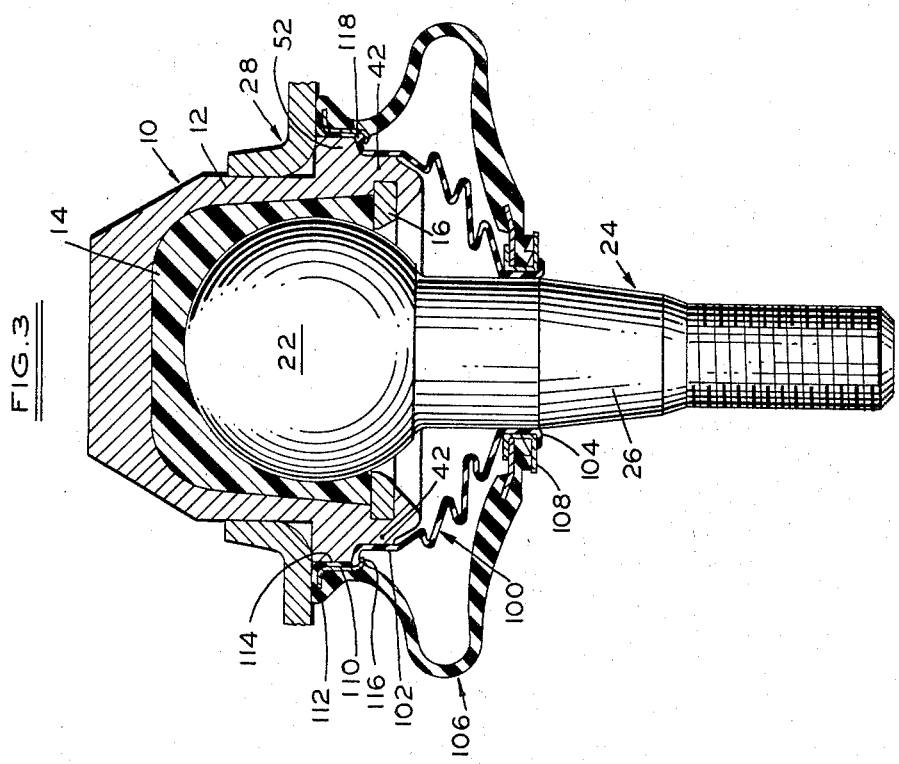
ROBERT A. HUSEN
INVENTOR
BY John R. Faulkner
Clifford L. Sadler
ATTORNEYS United States Patent Office 3,381,987
Patented May 7, 1968

3,381,987
DOUBLE WALL SEAL FOR ARTICULATED JOINTS
Robert A. Husen, Livonia, Mich., assignor to Ford Motor Company, Dearborn, Mich., a corporation of Delaware
Filed June 4, 1965, Ser. No. 461,335
7 Claims. (Cl. 287—90)

ABSTRACT OF THE DISCLOSURE

A flexible seal assembly for an articulated joint of the ball and socket type having inner and outer flexible seals engaging the two major parts of the joint.

The present invention relates generally to seal constructions for articulated joints, and more particularly to the construction of a seal for a ball and socket joint.

Ball and socket joints provide an articulated connection between two relatively movable members. Joints of this type have a number of uses. They are commonly provided in vehicle suspension systems to connect a vehicle suspension arm to a wheel supporting spindle. Ball joints are also used in the steering linkages of vehicles.

A conventional ball joint comprises a spherical or semi-spherical socket and a stud with a one- or two-piece spherical head that is seated in the socket. These joints are lubricated with grease to provide for low friction movement. In order to maintain the lubricant within the socket and prevent the entry of contaminating dirt that might damage the bearing surfaces, a boot seal is usually provided. A boot seal is often formed of a flexible material such as rubber. Such a seal has an annular shape with a small opening at one end that surrounds the stud and a large opening at the other end which surrounds the socket.

In automotive suspension systems, it has become a practice to provide a preloaded lubricated ball and socket joint containing a grease of improved quality that will retain good lubricating characteristics for extended usage beyond the heretofore conventional one thousand mile service interval. In order to accommodate a ball joint construction having such grease, superior means must be provided to retain the grease and prevent its contamination.

These have also been developed for automotive suspension systems, ball joints which do not employ any grease. These joints have a socket that is formed from a low friction plastic material such as Teflon. Joints of this type have even a greater need for adequate sealing. If dirt or grit should enter the socket of the joint, it will quickly score the bearing surface of the plastic socket which lead to its premature failure.

In accordance with these needs, it is an object of the present invention to provide a seal for a ball and socket joint having superior sealing characteristics.

It is a more specific object of the present invention to provide a two-part seal for enclosing the opening of a socket for a ball joint. Such a two-part seal comprises an inner stiff plastic member and an outer more flexible plastic or rubber seal. The inner seal wall functions as a backup for the outer seal and prevents contamination of the ball joint socket by any dirt which may get past the outer seal. Seals of this type are exposed to injury by tools and flying stones and the inner seal functions as a protective member in the event the outer seal is ruptured.

The many objects and advantages of the present invention will become apparent from the following discussion and the accompanying drawings in which:

FIGURE 1 is a sectional view of a ball and socket joint having a seal constructed according to the preferred embodiment of the present invention;

FIGURE 2 is a sectional view corresponding to FIGURE 1 showing angular displacement between the stud portion of the joint and the socket; and FIGURE 3 is a sectional view of a modification of the present invention showing an alternate construction of the double wall seal.

Referring now to the drawings for a more complete understanding of the present invention, FIGURE 1 illustrates a ball and socket joint 10 having a seal constructed in accordance with the invention. The joint 10 comprises a metal socket part 12 in which a plastic bearing piece 14 is secured. The metal socket part 12 has a generally cup shape and the bearing piece 14 has an exterior configuration that fits into the interior of the socket 12. The bearing piece 14 is retained in the socket 12 by a retaining ring 16 that is seated in a groove 18 formed near the periphery of the mouth of the cup-shaped socket 12. The bearing piece 14 has a spherical internal bearing surface 20 which rotatably and tiltably receives the ball portion 22 of a ball stud 24. In addition to having a ball portion, stud 24 has a shank 26 that extends outwardly through the mouth of the socket 12.

Due to the nature of the engagement between the ball head 22 and the bearing surface 20, the stud 24 is free to articulate with respect to the socket 12. This permits the joint to be used as a connection between relatively movable members such as suspension components of a motor vehicle. In the illustrated embodiment, a suspension arm 28 is provided with a cylindrical flange 30 which forms an opening 32. The socket 12 has a cylindrical exterior surface 34 that has a slightly greater outside diameter than the inside diameter of the opening 32. The socket 12 is press fitted into the hole 32 until a shoulder 36 comes into contact with the arm 28.

The shank portion 26 of the stud 24 is designed to be connected to a wheel spindle or wheel supporting spindle of a vehicle suspension system. Thus, the joint 10 provides a connection between the suspension arm and the spindle to permit the spindle to move in jounce and rebound as well as turn about a steering axis.

Because the ball joint embodiment illustrated in FIGURE 1 includes a plastic bearing piece 14, special precautions must be taken to protect the bearing surface 20. In accordance with the present invention, a double wall seal is provided. Such seal constructions include an inner seal 38 which has a generally annular shape and is molded from a stiff but flexible plastic such as nylon. The annular seal 38 has a large opening 40 at one end which permits it to be stretched into engagement with a cylindrical portion 42 of the socket 12. The seal 38 has a small opening at its other end which is provided with a beaded periphery 44 that is in sliding engagement with the shank 26 of the stud 24. The body portion of the seal 38 which connects the large and small opened ends 40 and 44 is corrugated in a bellows fashion to permit tilting movement of the stud 24 about the center of the ball portion 22.

An outer more flexible rubber boot seal assembly 46 surrounds the mouth of the socket 12 and the shank of the stud 24. It is the purpose of this seal, in cooperation with the inner seal 38, to retain lubricant within the ball joint assembly 10 and to prevent the entry of water, dirt and other contaminants.

The outer seal 46 is an annular member having a large opening 48 at one end that is surrounded by an enlarged lip 50. The large opening 48 is adapted to be stretched about a cylindrical portion 52 of the socket 12. Portion 52 is spaced outwardly from the cylinder portion 42 adjacent to the end of the inner seal 38. The enlarged lip 50 provides reinforcement for securing and stretching the mouth 48 about the cylindrical portion 52.

The body portion of the seal 46 bulges outwardly at 54 so that material is available for flexing during tilting movement.

A ferrule 56 surrounds a small opening 58 in the rubber body of the seal 46. A pair of annular ridges 60 and 62 are concentrically positioned outwardly of the periphery of the small opening 58 and are sloped in a direction away from the opening 48. An annular metal piece 64 is embedded in the rubber and serves as reinforcement for the ridges 60 and 62.

The ferrule 56 has a channel-shaped cross section with a large outer radial flange and a small inner radial flange. These two flanges are joined by a cylindrical portion. The channel formed by the two flanges and the cylindrical portion surround the opening 58 of the body of the seal 46. The inner and outer flanges are so spaced that the ridges 60 and 62 are slightly crushed and the inner surface of the reinforcement 64 is in sliding contact with the small inner radial flange.

The ferrule 56 engages the shank 26 of the stud 24 by a press fit. During steering movement of the spindle to which the stud 24 is secured, the ferrule will rotate with respect to the remainder of the seal 46. Sliding movement will occur between the ridges 60, 62 and the large outer flange, and also between the reinforcement 64 and the small inner flange.

With this construction, a positive seal is provided that is not dependent upon the finish of the stud 24. The desired engagement between the ferrule 58 and the small opening of the seal body 46 is achieved prior to the assembly of this suspension. In addition, turning or steering movement of the spindle does not cause wrinkling of the seal 46 due to the sliding connection with the ferrule 58.

FIGURE 2 illustrates the ball joint assembly of FIGURE 1 with the ball stud 24 tilted at its maximum angle of deflection. It will be noted that the shank 26 of the stud 24 is in contact with the retaining ring 16 for the bearing piece 14. This view illustrates the manner in which the bellows portion of the inner seal 38 is extended on one side and compressed on the short side. In a similar manner, the bulge portion 54 of the outer seal 46 is straightened to provide material for the angular displacement.

An alternate embodiment of the invention is illustrated in FIGURE 3 where the same ball joint socket 10 is press-fitted into an opening in a suspension arm 28. Similar to the joint of FIGURE 1, the socket 10 contains a cup-shaped bearing piece 14 that is retained by a snap ring 16. A ball stud 24 has a spherical head 22 seated in the bearing cup 14 and has a shank portion 26 that extends outwardly near the mouth of the socket 10.

In the embodiment of FIGURE 3, a double wall seal assembly has an inner seal member 100 with a large open end 102 that is positioned about the cylindrical portion 42 of the socket 12 adjacent to the mouth of the socket. Unlike the seal 38 of FIGURE 1 which has a tight sealed engagement with socket portion 42, seal end 102 has an internal diameter that is slightly greater than the diameter of portion 42. Therefore, seal 100 is free to slip on the socket.

The body portion at the inner seal 100 is corrugated or pleated for flexibility and terminates in a channel-shaped small end 104. The channel-shaped small end is in tight engagement with the shank 26 of the stud 24.

An outer seal member 106 is provided. The outer seal 106 has a small open end and a large open end similar to the seal member 46 in FIGURE 1. At the small open end the seal has a ferrule 108 of generally channel shape that slidably receives the adjacent portion of the body of the seal 106. The construction of the ferrule 108 and its engagement with the body of the seal 106 is similar to the construction of the seal 58 and its engagement with the reinforcement piece 64 and the angular ridges 60 and 62.

The annular ferrule 108 is seated in the channel portion 104 of the inner seal 100. The portion 104 and ferrule 108 are press fitted onto the shank 26 of the stud 24 and are adapted to rotate with the stud during steering movement. The ferrule 108 and the entire inner seal 100 are thus adapted to rotate relative to the body of the outer seal 106 and relative to the socket 12.

A metal retainer 110 is embedded in the lip portion 112 which defines the large open end 114 of the outer seal 106. The large open end or mouth 114 is in sealed engagement with the cylindrical portion 52 of the socket member 12. Element 110 functions as reinforcement for the lip 112. It also incorporates a hook portion 116 that is adapted to retain an enlarged bead 118 formed at the periphery of the large open end of the inner seal 100. Thus, in addition to reinforcing the clamping action of the lip 112 against the cylindrical portion 52, reinforcement member 110 also restrains the enlarged open end of the inner seal 100.

In general, the most vulnerable part of any seal is the point where relative motion occurs. In the construction of FIGURE 3, a labyrinth path is provided to preclude the escape of lubricants and the entrance of contaminants. The seal between the ferrule 108 and the adjacent ridges of the member 106 is in series with the seal between the end 102 of inner member 100 and socket 12. This doubles the path which the contaminants or lubricants must travel.

As in the embodiment of FIGURE 1, the inner seal of FIGURE 3 is of thin wall construction and preferably molded from a flexible plastic such as nylon. This plastic has a stiff but flexible consistency and due to the pleating and corrugations, it is possible to tilt the stud relative to the socket. The outer seal 106 is preferably molded from a material such as rubber and has a greater resiliency than the inner seal.

The foregoing description presents the presently preferred embodiment of this invention. Modifications and alterations may occur to those skilled in the art to come within the scope and spirit of the following claims.

I claim:

1. An articulated joint having a socket member, a stud member connected to said socket member and adapted to turn and tilt with respect to said socket member, said socket member having an internal cavity and a mouth portion, said stud member having one end seated in said cavity and another portion protruding from said mouth, an annular flexible inner seal having a large opening at one end in sealed engagement with said socket member, said seal having a small opening at its other end in sliding engagement with said stud member, said seal having a corrugated body portion, a second flexible seal of annular configuration spaced outwardly from and concentric about said first seal, said outer second seal having a large open end in sealed engagement with said socket member at a point spaced from the engagement of said inner seal for said socket member, said outer seal being in sealed engagement with said stud member, said outer seal being formed of a material having greater flexibility than said inner seal.

2. An articulated joint having a socket member, a stud member connected to said socket member and adapted to turn and tilt with respect to said socket member, said socket member having an internal cavity and a mouth portion, said stud member having one end seated in said cavity and another portion protruding from said mouth, an annular flexible inner seal having a large open end in sliding sealed engagement with said socket member, said inner seal having a small open end in sealed engagement with said stud member, said inner seal being constructed to turn with said stud member relative to said socket member, a second flexible seal of annular configuration spaced outwardly from and concentric about said first seal, said outer second seal having a large open end in sealed engagement with said socket member at a point spaced from the engagement of said inner seal with said socket member, means connected to said outer seal adjacent to its large open end and constructed to retain the large open end of said innner seal in engagement with said socket member, said outer seal having its small open end in sealed engagement with said inner seal adjacent to its small end.

3. An articulated joint having a socket member, a stud member connected to said socket member and adapted to turn and tilt with respect to said socket member, said socket member having an internal cavity and a mouth portion, said stud member having one end seated in said cavity and another portion protruding from said mouth, an annular flexible inner seal having a large open end in sliding sealed engagement with said socket member, said inner seal having a small open end in sealed engagement with said stud member, said inner seal being constructed to turn with said stud member relative to said socket member, said inner seal having a corrugated body portion, a second flexible seal of annular configuration spaced outwardly from and concentric about said first seal, said outer second seal having a large open end in sealed engagement with said socket member at a point spaced from the engagement of said inner seal with said socket member, means connected to said outer seal adjacent to its large open end and constructed to retain the large open end of said inner seal in engagement with said socket member, said outer seal having its small open end in sealed engagement with said inner seal adjacent to its small end, said outer seal being formed of a material having greater flexibility than said inner seal.

4. An articulated joint having a socket member, a stud member connected to said socket member and adapted to turn and tilt with respect to said socket member, said socket member having an internal cavity and a mouth portion, said stud member having one end seated in said cavity and another portion protruding from said mouth, an annular flexible inner seal having a large open end in sliding sealed engagement with said socket member, said inner seal having a small open end in sealed engagement with said stud member, said inner seal being constructed to turn with said stud member relative to said socket member, said inner seal having a corrugated body portion, a second flexible seal of annular configuration spaced outwardly from and concentric about said first seal, said outer second seal comprising first and second portions, said first portion having a large open end in sealed engagement with said socket member at a point spaced from the engagement of said inner seal with said socket member, means connected to said first portion adjacent to its large open end and constructed to retain the large open end of said inner seal in engagement with said socket member, said second portion being in sealed engagement with said inner seal adjacent to its small end, said first and second portions being connected by means permitting relative movement therebetween, said outer seal being formed of a material having greater flexibility than said inner seal.

5. An articulated joint having a socket member, a stud member connected to said socket member and adapted to turn and tilt with respect to said socket member, said socket member having an internal cavity and a mouth portion, said stud member having one end seated in said cavity and another portion protruding from said mouth, an annular flexible inner seal having a large open end in sliding sealed engagement with said socket member, said inner seal having a small open end in sealed engagement with said stud member, said inner seal being constructed to turn with said stud member relative to said socket member, a second flexible seal of annular configuration spaced outwardly from and concentric about said first seal, said outer second seal having a large open end in sealed engagement with said socket member at a point spaced from the engagement of said inner seal with said socket member, said outer seal having its small open end in sealed engagement with said inner seal adjacent to its small end.

6. An articulated joint having a socket member, a stud member connected to said socket member and adapted to turn and tilt with respect to said socket member, said socket member having an internal cavity and a mouth portion, said stud member having one end seated in said cavity and another portion protruding from said mouth, an annular flexible inner seal having a large open end in sliding sealed engagement with said socket member, said inner seal having a small open end in sealed engagement with said stud member, said inner seal being constructed to turn with said stud member relative to said socket member, a second flexible seal of annular configuration spaced outwardly from and concentric about said first seal, said outer second seal comprising first and second portions, said first portion having a large open end in sealed engagement with said socket member at a point spaced from the engagement of said inner seal with said socket member, said second portion being in sealed engagement with said inner seal adjacent to its small end, said first and second portions being connected by means permitting relative movement therebetween.

7. An articulated joint for use in an automotive suspension system, steering linkage and the like; having a socket member, a stud member connected to said socket member and adapted to turn and tilt with respect to said socket member, said socket member having an internal cavity and a mouth portion, said stud member having one end seated in said cavity and another portion protruding through said mouth portion an annular relatively stiff inner boot seal having a large opening at one end in engagement with said socket member, said seal having a small opening at its other end in engagement with said stud member, a second flexible boot seal of annular configuration spaced outwardly from and concentric about and enclosing said first seal, said outer second seal having a large open end in sealed engagement with said socket member, said outer seal being in sealed engagement with said stud member at its other end, said outer seal being formed of a material having greater flexibility than that of said inner seal, said relatively stiff inner seal providing a stiff backup surface adjacent said mouth portion and between the flexible outer seal and the edge of said mouth portion which surface prevents contamination of the joint in the event of rupture of the flexible outer seal by tools, flying stones and the like.

References Cited
UNITED STATES PATENTS

| | | | |
|---|---|---|---|
| 2,197,037 | 4/1940 | Gardner | 287—90 |
| 2,211,817 | 8/1940 | Hufferd et al. | 287—90 |
| 3,052,477 | 9/1962 | Parker | 287—90 |
| 3,275,353 | 9/1966 | Turck et al. | 287—90 |
| 3,282,602 | 11/1966 | Willingshofer et al. | 287—90 |

EDWARD C. ALLEN, *Primary Examiner.*

CARL W. TOMLIN, *Examiner.*

A. KUNDRAT, *Assistant Examiner.*